US012757123B2

(12) United States Patent
Chen et al.

(10) Patent No.: US 12,757,123 B2
(45) Date of Patent: Oct. 6, 2026

(54) METHOD FOR POWER CONTROL PARAMETER DETERMINATION, TERMINAL, AND NETWORK DEVICE

(71) Applicant: GUANGDONG OPPO MOBILE TELECOMMUNICATIONS CORP., LTD., Dongguan (CN)

(72) Inventors: Wenhong Chen, Dongguan (CN); Yun Fang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 433 days.

(21) Appl. No.: 17/845,554

(22) Filed: Jun. 21, 2022

(65) Prior Publication Data

US 2022/0330167 A1 Oct. 13, 2022

Related U.S. Application Data

(63) Continuation of application No. PCT/CN2020/073819, filed on Jan. 22, 2020.

(51) Int. Cl.
*H04W 52/14* (2009.01)
*H04W 72/23* (2023.01)

(52) U.S. Cl.
CPC ......... *H04W 52/146* (2013.01); *H04W 72/23* (2023.01)

(58) Field of Classification Search
CPC ........... H04W 52/00-60; H04W 72/23; H04W 52/146
See application file for complete search history.

(56) References Cited

U.S. PATENT DOCUMENTS

| | | | | |
|---|---|---|---|---|
| 11,234,199 | B2 * | 1/2022 | Xu | H04W 52/36 |
| 2009/0164640 | A1 * | 6/2009 | Schultz | G06Q 10/00 709/227 |
| 2019/0239093 | A1 | 8/2019 | Zhang et al. | |
| 2019/0239245 | A1 | 8/2019 | Davydov et al. | |
| 2019/0261280 | A1 | 8/2019 | Jung et al. | |
| 2020/0146059 | A1 * | 5/2020 | Cirik | H04L 5/001 |
| 2020/0174939 | A1 * | 6/2020 | Nair | G06F 12/0888 |
| 2020/0351039 | A1 * | 11/2020 | Zhou | H04L 5/0098 |
| 2021/0135830 | A1 * | 5/2021 | Yu | H04B 7/06966 |
| 2021/0195583 | A1 * | 6/2021 | Venugopal | H04W 74/0833 |

(Continued)

FOREIGN PATENT DOCUMENTS

| | | |
|---|---|---|
| CN | 102595596 | 7/2012 |
| CN | 110167126 | 8/2019 |
| CN | 110351058 | 10/2019 |

(Continued)

OTHER PUBLICATIONS

ZTE, "Enhancements on multi-beam operation," 3GPP TSG RAN WG1 Meeting #99, R1-1911931, Nov. 2019.

(Continued)

*Primary Examiner* — Raymond S Dean
(74) *Attorney, Agent, or Firm* — Hodgson Russ LLP

(57) ABSTRACT

A method for power control parameter determination, a terminal, a network device, and a storage medium are provided. The method includes the following. A target transmission configuration indication (TCI) state for an uplink signal is determined. A power control parameter of the uplink signal is determined according to the target TCI state.

12 Claims, 6 Drawing Sheets

(56) References Cited

U.S. PATENT DOCUMENTS

| | | | | |
|---|---|---|---|---|
| 2022/0295417 | A1* | 9/2022 | Sun | H04W 52/242 |
| 2022/0408371 | A1* | 12/2022 | Matsumura | H04W 52/242 |

FOREIGN PATENT DOCUMENTS

| | | | |
|---|---|---|---|
| CN | 110392418 | 10/2019 | |
| CN | 110474730 | 11/2019 | |
| CN | 110535617 | 12/2019 | |
| CN | 111901020 | 11/2020 | |
| CN | 114846761 | 8/2022 | |
| WO | 2019080132 | 5/2019 | |
| WO | WO-2019096317 A1 * | 5/2019 | H04B 7/0408 |
| WO | 2019157895 | 8/2019 | |

OTHER PUBLICATIONS

VIVO, "Discussion on remaining issues on multi beam enhancement," 3GPP TSG RAN WG1 #98bis R1-1910230, Oct. 2019.
VIVO, "Remaining issues on NR UL power control," 3GPP TSG RAN WG1 Meeting #92, R1-1801546, Mar. 2018.
ZTE, "Enhancements on multi-beam operation," 3GPP TSG RAN WG1 Meeting #98bis, R1-1910285, Oct. 2019.
WIPO, International Search Report and Written Opinion for International Application No. PCT/CN2020/073819, Oct. 26, 2020.
ZTE, "Enhancements on multi-beam operation," 3GPP TSG RAN WG1 Meeting #98, R1-1908192, Aug. 2019.
Nokia et al., "Thursday offline session summary: QCL assumption for Als 7.2.13.4 and 7.2.13.6," 3GPP TSG RAN WG1 Meeting #99, R1-1913524, Nov. 2019.
Ericsson, "Multi-RAT Dual-Connectivity and Carrier Aggregation enhancements," 3GPP TSG RAN meeting #86, RP-192402, Dec. 2019.
CNIPA, First Office Action for CN Application No. 202310067780.0, Jul. 8, 2024.
CATT, "Consideration on multi-beam enhancements," 3GPP TSG RAN WG1 Meeting #98, R1-1908603, Aug. 2019.
EPO, Extended European Search Report for EP Application No. 20915431.9, Nov. 28, 2022.
NTT DOCOMO, Inc. "Discussion on multi-beam enhancement," 3GPP TSG RAN WG1 #97, R1-1906225, May 2019.
CNIPA, Second Office Action for CN Application No. 202310067780.0, Sep. 27, 2024.
OPPO, "Discussion on Multi-beam Operation Enhancements," 3GPP TSG RAN WG1 #99, R1-1911844, Nov. 2019.
Huawei et al., "Remaining issues on simultaneous reception and transmission over CCs and BWPs," 3GPP TSG RAN WG4 Meeting #AH-1807, R4-1809056, Jul. 2018.
CNIPA, Notification to Grant Patent Right for Invention for CN Application No. 202310067780.0, Nov. 28, 2024.

* cited by examiner

METHOD FOR POWER CONTROL PARAMETER DETERMINATION, TERMINAL, AND NETWORK DEVICE

CROSS REFERENCE TO RELATED APPLICATION(S)

This application is a continuation of International Application No. PCT/CN2020/073819, filed on Jan. 22, 2020, the entire disclosure of which is incorporated herein by reference.

TECHNICAL FIELD

This application relates to the field of communication, and specifically to a method for power control parameter determination, a terminal, and a network device.

BACKGROUND

In the related art, a transmit beam of an uplink signal (for example, a physical uplink shared channel (PUSCH)) is determined according to a sounding reference signal (SRS) resource indicator (SRI) in downlink control information (DCI), and a power control parameter of the PUSCH is also determined according to the SRI as well as a correspondence configured via higher-layer signaling. Other uplink signals are also determined similarly, but with different signaling used. A receive beam of a downlink signal is indicated via a transmission configuration indication (TCI) state, and according to the TCI state, a terminal device can determine a reference signal that uses the same receive beam as a target downlink signal. In new radio (NR) evolution, the transmit beam of the uplink signal can also be indicated via the TCI state, that is, the terminal device can obtain the reference signal according to the TCI state like the downlink, so as to obtain a transmit beam of a target uplink signal. In this case, how to determine a power control parameter of the uplink signal to determine an appropriate transmit power is a problem to be solved.

For the above problems, no effective solution has yet been proposed.

SUMMARY

In a first aspect, a method for power control parameter determination is provided. The method includes the following. A target TCI state for an uplink signal is determined. A power control parameter of the uplink signal is determined according to the target TCI state.

In a second aspect, a terminal is provided. The terminal includes a processor and a memory. The memory is configured to store computer programs. The processor is configured to invoke and execute the computer programs stored in the memory, to perform the method in the first aspect or in various implementations of the first aspect.

In a third aspect, a network device is provided. The network device includes a processor and a memory. The memory is configured to store computer programs. The processor is configured to invoke and execute the computer programs stored in the memory, to perform a method for power control parameter determination. The method includes the following. A correspondence between TCI states and power control parameters is configured for a terminal. A target TCI state for an uplink signal is configured for the terminal, where the target TCI state and the correspondence are used for the terminal to determine a power control parameter of the uplink signal.

BRIEF DESCRIPTION OF THE DRAWINGS

The accompanying drawings described herein are intended for further understanding of the disclosure and constitute part of the disclosure. Exemplary implementations of the disclosure as well as elaborations thereof are intended for explaining, rather than limiting, the disclosure. In the accompanying drawings.

DETAILED DESCRIPTION

The following will describe technical solutions of implementations of the disclosure with reference to the accompanying drawings of implementations of the disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

The technical solutions of implementations of the disclosure are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (LTE-FDD) system, an LTE time division duplex (LTE-TDD) system, a universal mobile telecommunication system (UMTS), a worldwide interoperability for microwave access (WiMAX) communication system, or a $5^{th}$ generation (5G) system, etc.

Figure 1:
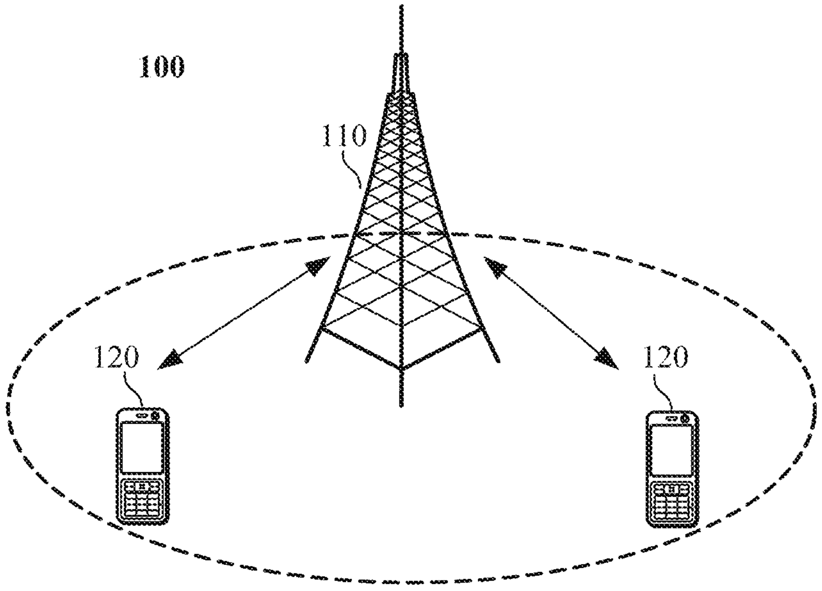
FIG. 1 is a schematic diagram of a communication system to which implementations of the disclosure are applicable.

Exemplarily, FIG. 1 illustrates a communication system 100 to which implementations of the disclosure are applicable. The communication system 100 may include a network device 110. The network device 110 may be a device that communicates with a terminal device 120 (also referred to as a communication terminal or a terminal). The network device 110 can provide a communication coverage for a specific geographical area and communicate with terminal devices in the coverage area. Optionally, the network device 110 may be a base transceiver station (BTS) in a GSM or in a CDMA system, or may be a NodeB (NB) in a WCDMA system, or may be an evolutional Node B (eNB or eNodeB) in an LTE system, or may be a radio controller in a cloud radio access network (CRAN). Or the network device may be a mobile switching center, a relay station, an access point, an in-vehicle device, a wearable device, a hub, a switch, a bridge, a router, a network-side device in a 5G network, or a network device in a future evolved public land mobile network (PLMN), etc.

The communication system 100 further includes at least one terminal device 120 in a coverage area of the network device 110. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of a mobile terminal may include, but are not limited to, a satellite telephone or cellular telephone, a personal communication system (PCS) terminal integrated with functions of cellular radio telephone, data processing, fax, and data communication, a personal digital assistant (PDA) equipped with radio telephone, pager, Internet/Intranet access, web browser, notebook, calendar, and/or global positioning system (GPS) receiver, and a conventional laptop and/or a handheld receiver, or other electronic devices equipped with radio telephone transceiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in a 5G network, a terminal device in a future evolved PLMN, etc.

Optionally, terminal devices 120 can communicate with each other through device to device (D2D) communication.

Optionally, a 5G system or 5G network can also be referred to as a new radio (NR) system or NR network.

FIG. 1 exemplarily illustrates one network device and two terminal devices. Optionally, the communication system 100 may also include multiple network devices, and there can be other numbers of terminal devices in a coverage area of each of the network devices. Implementations of the disclosure are not limited in this regard.

Optionally, the communication system 100 may further include other network entities such as a network controller, a mobile management entity, or the like, and implementations of the disclosure are not limited in this regard.

It should be understood that, according to implementations of the disclosure, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be elaborated again herein. The communication device may further include other devices such as a network controller, a mobile management entity, or other network entities in the communication system 100, and implementations of the disclosure are not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "I" herein generally indicates that the associated objects are in an "or" relationship.

Figure 2:
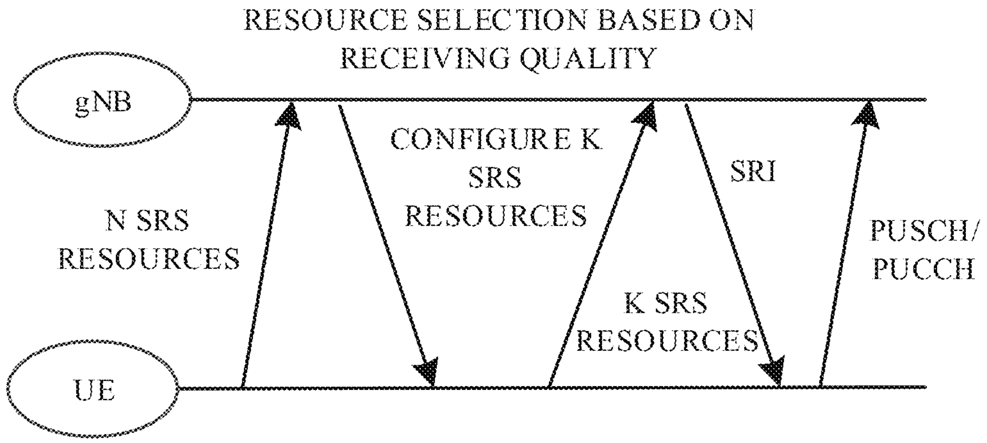
FIG. 2 is a schematic diagram illustrating an uplink beam management procedure according to a specific implementation of the disclosure.

In NR, uplink beam management can be performed in the following manner. A terminal can use an analog beam to transmit uplink data and uplink control information. The terminal can perform uplink beam management based on a sounding reference signal (SRS), to determine an analog beam used for uplink transmission. FIG. 2 is a schematic diagram illustrating an uplink beam management procedure according to a specific implementation of the disclosure. As illustrated in FIG. 2, a network can configure SRS resource set 1 for the terminal, where the set contains N SRS resources (N>1). The terminal can use different beams to transmit the N SRS resources. A network device measures a receiving quality of each of the N SRS resources respectively, and selects K SRS resources having the best receiving quality. The network device can further configure SRS resource set 2 which contains K SRS resources, and the terminal can transmit SRS resources in SRS resource set 2 by using analog beams used by the K SRS resources selected from SRS resource set 1. This can be achieved by configuring the K SRS resources selected from SRS resource set 1 as reference SRS resources of the K SRS resources in SRS resource set 2 respectively. In this case, among the SRS resources in SRS resource set 2 transmitted by the terminal, the network device can select one SRS resource having the best receiving quality, and notify a SRS resource indicator (SRI) corresponding the selected SRS resource to the terminal. After receiving the SRI, the terminal determines an analog beam used by the SRS resource indicated by the SRI as an analog beam used for physical uplink shared channel (PUSCH) transmission. For a PUSCH, the SRI may be indicated via an SRI indication field in downlink control information (DCI).

For a physical uplink control channel (PUCCH), the beam used can be indicated similarly. Specifically, each PUCCH resource is configured with multiple pieces of PUCCH-spatialrelationinfo via radio resource control (RRC) signaling, and then PUCCH-spatialrelationinfo currently used is indicated via media access control (MAC)-layer signaling, where each PUCCH-spatialrelationinfo contains one reference signal used for determining a transmit beam of the PUCCH. For each SRS resource, corresponding SRS-spatialrelationinfo can be configured via RRC signaling, where SRS-spatialrelationinfo contains a reference signal used for determining a transmit beam of an SRS.

In an NR system, a quasi-co-location (QCL) indication transmitted on a downlink signal can be configured in the following manner: the network device can configure a corresponding transmission configuration indication (TCI) state for each downlink signal or downlink channel, to indicate a QCL reference signal corresponding to a target downlink signal or target downlink channel. As such, the terminal can receive the target downlink signal or target downlink channel according to the reference signal.

One TCI state may contain the following configurations:

(1) TCI state identity (ID), used for identifying a TCI state;

(2) QCL information 1;

(3) QCL information 2.

One piece of QCL information contains the following information:

(1) QCL type configuration, which may be one of QCL type A, QCL type B, QCL type C, or QCL type D;

(2) QCL reference signal configuration, which includes an ID of a cell that a reference signal belongs to, an ID of a bandwidth part (BWP) that the reference signal belongs to, and an identifier of the reference signal (which may be a channel state information-reference signal (CSI-RS) resource ID or a synchronization signal block (SSB) index);

A QCL type of at least one of QCL information 1 and QCL information 2 is one of type A, type B, or type C. A QCL type of another one of QCL information 1 and QCL information 2 (if configured) is QCL type D.

Different QCL type configurations are defined as follows:

(1) 'QCL-TypeA': {Doppler shift, Doppler spread, average delay, delay spread}

(2) 'QCL-TypeB': {Doppler shift, Doppler spread}

(3) 'QCL-TypeC': {Doppler shift, average delay}

(4) 'QCL-TypeD': {Spatial Rx parameter}

If the network device configures, according to a TCI state, a QCL reference signal of a target downlink channel to be a reference SSB or a reference CSI-RS resource, and the QCL type configuration is type A, type B, or type C, the terminal can assume that a target downlink signal has the same target large-scale parameter as the reference SSB or the reference CSI-RS resource, and thus can use the same reception parameter for reception, where the target large-scale parameter is determined according to the QCL type configuration. Similarly, if the network device configures, according to a TCI state, a QCL reference signal of a target downlink channel to be a reference SSB or a reference CSI-RS resource, and the QCL type configuration is type D, the terminal can receive a target downlink signal by using the same receive beam (that is, spatial reception (Rx) parameter) used for receiving the reference SSB or the reference CSI-RS resource. In general, the target downlink channel and its reference SSB or reference CSI-RS resource are transmitted by the network device via the same transmission reception point (TRP), the same panel, or the same beam. If transmit TRPs, transmit panels, or transmit beams of two downlink signals or downlink channels are different, different TCI states are usually configured.

Figure 3:
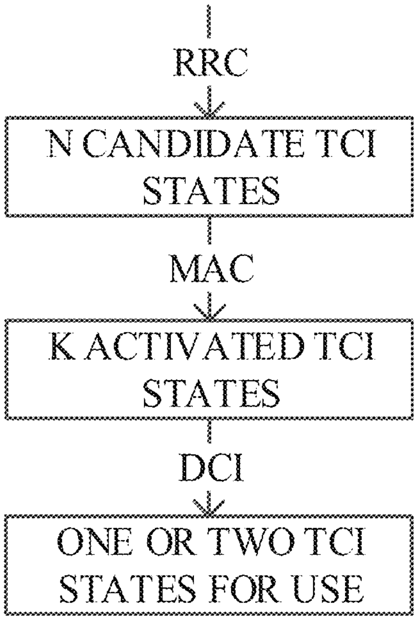
FIG. 3 is a schematic diagram of a method for transmission configuration indication (TCI) state configuration for a physical downlink shared channel (PDSCH) according to a specific implementation of the disclosure.

For a downlink control channel, a TCI state may be indicated via RRC signaling or RRC signaling+MAC signaling. For a downlink data channel, FIG. 3 is a schematic diagram of a method for TCI state configuration for a physical downlink shared channel (PDSCH) according to a specific implementation of the disclosure. As illustrated in FIG. 3, an available TCI state set is indicated via RRC signaling, and some of the TCI states are activated via MAC layer signaling. Then one or two TCI states are indicated from the activated TCI states via a TCI-state indication field in DCI and then used for a PDSCH scheduled by the DCI.

For an uplink signal, a transmit power of the uplink signal is determined according to a power control parameter of the uplink signal. The power control parameter of the uplink signal may be of various types, for example, may include at least one of: a parameter used for determining a target receive power, a parameter used for determining a pathloss weight factor, a downlink reference signal used for pathloss measurement, or a parameter used for determining a closed-loop power control adjustment state.

For example, in the related art, a transmit power of a PUSCH may be calculated according to the following formula:

$$P_{PUSCH,b,f,c}(i,j,q_d,l)=\min\left\{\begin{array}{l}P_{CMAX,f,c}(i),\\ P_{O\_PUSCH,b,f,c}(j)+10\log_{10}\left(2^{\mu}\cdot M^{PUSCH}_{RB,b,f,c}(i)\right)+\\ \alpha_{b,f,c}(j)\cdot PL_{b,f,c}(q_d)+\Delta_{TF,b,f,c}(i)+f_{b,f,c}(i,l)\end{array}\right\}$$

$P_{CMAX,f,c}(i)$, is a maximum transmit power of a terminal on a present carrier, i is an index of one PUSCH transmission, and j is an open-loop power control parameter index (including target power $P_{O\_PUSCH,b,f,c}(i)$ and pathloss factor $\alpha_{b,f,c}(j)$); $q_d$ is an index of a reference signal used for pathloss measurement, which is used for obtaining pathloss value $PL_{b,f,c}(q_d)$ and is also an open-loop power control parameter; $f_{b,f,c}(i, 1)$ is a closed-loop power control adjustment factor, where 1 is an index of a closed-loop power control process. The terminal determines a closed-loop power adjustment factor according to a transmit power control (TPC) command field transmitted by a network device. The TPC command field may be carried by DCI in a UE search space used for scheduling a PUSCH, or may be carried by DCI format 2_2 in a common search space used for carrying a group TPC command field.

In NR, the terminal determines a transmit beam of a scheduled PUSCH according to an SRI in DCI, and also determines a power control parameter of the PUSCH according to the SRI. Optionally, the network device pre-configures multiple SRI-PUSCH-PowerControl parameter fields via RRC signaling, where each parameter field corresponds to one SRI value. The parameter field contains a group of PUSCH power control parameter configurations (such as j, $q_d$, 1) corresponding to the SRI value. When the SRI indicates a different value, a transmit power of a currently scheduled PUSCH is determined according to a power control parameter configuration in a corresponding parameter field (SRI-PUSCH-PowerControl).

For another example, in the related art, a transmit power of an SRS may be calculated according to the following formula:

$$P_{SRS,b,f,c}(i,q_s,l)=\min\left\{\begin{array}{l}P_{CMAX,f,c}(i),\\ P_{O\_SRS,b,f,c}(q_s)+10\log_{10}(2^{\mu}\cdot M_{SRS,b,f,c}(i))+\\ \alpha_{SRS,b,f,c}(q_s)\cdot PL_{b,f,c}(q_d)+h_{b,f,c}(i,l)\end{array}\right\}$$

i is an index of one SRS transmission, $q_s$ is an open-loop power control parameter index (including target power $P_{O\_SRS,b,f,c}(q_s)$ and pathloss factor $\alpha_{SRS,b,f,c}(q_s)$); $q_d$ is an index of a reference signal used for pathloss measurement, which is used for obtaining pathloss value $PL_{b,f,c}(q_d)$ and is also an open-loop power control parameter; $h_{b,f,c}(i,l)$ is a closed-loop power control adjustment factor, where l is an index of a closed-loop power control process. $q_d$ and $q_s$ are contained in a configuration parameter of an SRS resource set, and configured for a terminal via higher-layer signaling. If an SRS and a PUSCH are configured via higher-layer signaling to adopt the same power control process, then $h_{b,f,c}(i,1)=f_{b,f,c}(i,1)$. If an SRS is configured via higher-layer signaling to adopt a separate power control process, a network device indicates a TPC command of an SRS of each terminal via DCI format 2_3 in a common search space. The terminal determines a closed-loop power adjustment factor according to its own TPC command regardless of PUSCH closed-loop power adjustment factor.

Based on the related art described above, in NR evolution, a transmit beam of an uplink signal can also be indicated via a TCI state, that is, a terminal device can obtain a reference signal according to the TCI state like the downlink, so as to obtain a transmit beam of a target uplink signal. In this case, how to determine a power control parameter of the uplink signal to determine an appropriate transmit power is a problem to be solved.

To this end, implementations of the disclosure provide a method for power control parameter determination, a terminal, a network device, and a storage medium, which provides a standard for the terminal to determine a power control parameter of an uplink signal according to a transmission configuration indication (TCI) state, such that the terminal can transmit the uplink signal at an appropriate transmit power, thus meeting requirements for development of technical standards.

Figure 4:
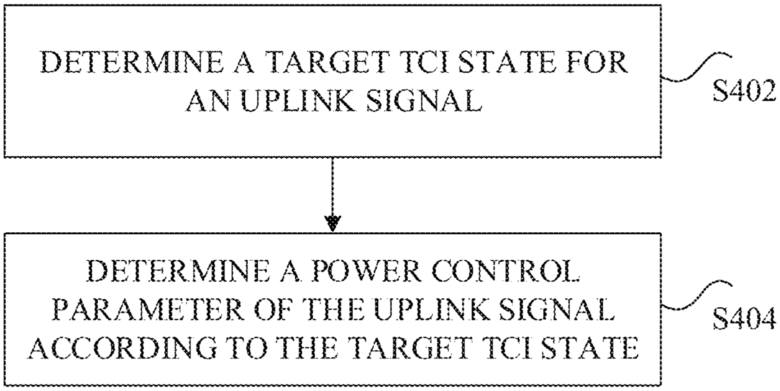
FIG. 4 is a schematic flowchart of method I for power control parameter determination provided in implementations of the disclosure.

Implementations of the disclosure provide a method for power control parameter determination. FIG. 4 is a schematic flowchart of method I for power control parameter determination provided in implementations of the disclosure. As illustrated in FIG. 4, the method includes the following.

S402, a target TCI state for an uplink signal is determined. The TCI state may include multiple pieces of information, for example, may include at least one of: a QCL type, a source reference signal (which may be, for example, a source reference signal ID), a reference serving cell, or a reference BWP.

S404, a power control parameter of the uplink signal is determined according to the target TCI state. The target TCI state may be a TCI state used for determining a transmit beam of the uplink signal, or may be a TCI state dedicated for determining a power control parameter, etc. The power control parameter may also be of multiple types, for example, may include at least one of: a parameter used for determining a target receive power, a parameter used for determining a pathloss weight factor, a downlink reference signal used for pathloss measurement, or a parameter used for determining a closed-loop power control adjustment state.

Through the above operations, a terminal can determine the power control parameter according to the determined TCI state for an uplink signal (such as a TCI state configured by a network device), thereby determining an appropriate transmit power to transmit the uplink signal. As such, it is possible to provide a standard for the terminal to determine a power control parameter of an uplink signal according to a TCI state, such that the terminal can transmit the uplink signal at an appropriate transmit power, which can meet requirements for development of technical standards.

As an optional implementation, the method can be executed by a terminal. The terminal may be a mobile terminal, for example, may be a 5G mobile terminal such as smart phone, smart vehicle, unmanned aerial vehicle, robot, etc.

As an optional implementation, the power control parameter of the uplink signal may be determined according to the target TCI state in various manners. For example, if a correspondence between TCI states and power control parameters is configured for the terminal by a network device, the power control parameter can be determined according to the configured correspondence. For instance, the power control parameter of the uplink signal may be determined according to the target TCI state and the correspondence between TCI states and power control parameters.

As an optional implementation, the correspondence can be determined in various manners, for example, the correspondence between TCI states and power control parameters can be determined in at least one of the following manners.

(1) A power control parameter corresponding to a TCI state is contained in first higher-layer signaling used for configuring the TCI state. In other words, higher-layer signaling used by a network device to configure a TCI state for the terminal directly contains the TCI state and a power control parameter corresponding to the TCI state. It is to be noted that, the TCI state contained in the higher-layer signaling may be multiple TCI states, and therefore, the higher-layer signaling further contains power control parameters corresponding to the multiple TCI states respectively.

(2) A correspondence between TCI state IDs of TCI states and power control parameters that is configured via second higher-layer signaling is received, and the correspondence between TCI states and power control parameters is determined according to the correspondence. In other words, the network device configures for the terminal a correspondence between TCI state IDs and power control parameters, to configure for the terminal a correspondence between TCI states identified by the TCI state IDs and power control parameters.

(3) The correspondence between TCI states and power control parameters is determined according to RRC signaling and a media access control-control element (MAC CE), where the RRC signaling is used for configuring an initial correspondence between TCI states and power control parameters, and the MAC CE is used for activating or updating the initial correspondence. In other words, the initial correspondence is first configured via the RRC signaling and then activated or updated via the MAC CE, to obtain an activated or updated correspondence between TCI states and power control parameters. It is to be noted that, update of the initial correspondence may refer to update of TCI state or power control parameter, that is, the correspondence is updated as long as one of TCI state or power control parameter is updated. In addition, the MAC CE may also be used for updating only some parameters of multiple power control parameters corresponding to one TCI state.

It is to be noted that, the above manners of determining the correspondence between TCI states and power control parameters may be adopted flexibly according to actual needs, or may be adopted according to different signaling used for communication between the network device and the terminal.

For another example, if no correspondence between TCI states and power control parameters is configured for the terminal by a network device, that is, no signaling used for configuring the correspondence between TCI states and power control parameters is received by the terminal, a power control parameter with the lowest index in a candidate set of power control parameters is determined as the power control parameter of the uplink signal.

Through the above operations, for a case where the correspondence between TCI states and power control parameters is configured for the terminal by the network device, and for a case where no correspondence between TCI states and power control parameters is configured for the terminal by the network device, the power control parameter of the uplink signal is determined respectively. In other words, no matter whether the correspondence is configured for the terminal by the network device, the terminal can determine the power control parameter of the uplink signal according to the target TCI state for the uplink signal, thereby transmitting the uplink signal at an appropriate transmit power.

As an optional implementation, the power control parameter of the uplink signal may be determined according to the target TCI state as follows. If a source reference signal indicated by the target TCI state is an uplink reference signal, a power control parameter of the source reference signal indicated by the target TCI state is determined as the power control parameter of the uplink signal. In other words, in case the source reference signal indicated by the target TCI state is an uplink reference signal, the power control parameter of the source reference signal is the power control parameter of the uplink signal.

As an optional implementation, the power control parameter of the uplink signal may be determined according to the target TCI state as follows. If a source reference signal indicated by the target TCI state is a downlink reference signal and the power control parameter is a downlink reference signal used for pathloss measurement, the source reference signal indicated by the target TCI state is determined as the power control parameter of the uplink signal. In other words, in case the source reference signal indicated by the target TCI state is a downlink reference signal and the power control parameter is a downlink reference signal used for pathloss measurement, the source reference signal is the power control parameter of the uplink signal.

As an optional implementation, if the uplink signal is an SRS and the power control parameter is a closed-loop power control adjustment state, the power control parameter of the uplink signal may be determined according to the target TCI state as follows. SRSs on different SRS resources in one SRS resource set have a same closed-loop power control adjustment state that is determined according to the target TCI state. Although different SRS resources in one SRS resource set may correspond to different target TCI states, closed-loop power control adjustment states determined according to these target TCI states and the correspondence between TCI states and power control parameters are the same. Through the above operations, one SRS resource set can be used for SRS transmission on one panel. One panel (corresponding to the same SRS resource set) adopts the same closed-loop power control adjustment state, and different panels adopt different closed-loop power control adjustment states, which can achieve separate SRS closed-loop power control on each panel.

As an optional implementation, the terminal can further receive a carrier set configured by a network device, where at least one uplink signal on each carrier in the carrier set, which is of the same type as the uplink signal, also corresponds to or adopts the target TCI state; or at least one uplink signal on each carrier in the carrier set, which is of the same type as the uplink signal, corresponds to a TCI state with the same TCI state ID as the target TCI state. Through the above operations, few signaling indications are required for determining power control parameters of uplink signals on multiple carriers, that is, the terminal can determine an appropriate transmit power for an uplink signal on each carrier in the carrier set.

As an optional implementation, the target TCI state can be determined in various manners according to different uplink signals. The following will exemplify the uplink signal to be a PUSCH, a PUCCH, an SRS, and a physical random access channel (PRACH) respectively for illustration.

Optionally, if the uplink signal is a PUSCH, the target TCI state for the uplink signal is determined as follows. A TCI state indicated by TCI-state indication information in DCI used for scheduling the PUSCH is determined as the target TCI state.

The target TCI state may be a TCI state indicated by the TCI-state indication information from at least one candidate TCI state that is used for PUSCH transmission and activated via a MAC CE.

If the uplink signal is a PUSCH, and DCI used for scheduling the PUSCH does not contain TCI-state indication information or a time interval between DCI used for scheduling the PUSCH and the PUSCH is less than a preset threshold value, determining the target TCI state for the uplink signal includes one of the following. A TCI state with the lowest TCI state ID among at least one candidate TCI state that is used for PUSCH transmission and activated via a MAC CE is determined as the target TCI state. A first candidate TCI state that is used for PUSCH transmission and activated via a MAC CE is determined as the target TCI state. A TCI state indicated by a minimum indication value of TCI-state indication information in the DCI is determined as the target TCI state. A TCI state with the lowest TCI state ID among at least one TCI state configured via RRC is determined as the target TCI state. A TCI state corresponding to a control resource set (CORESET) that a physical downlink control channel (PDCCH) carrying the DCI belongs to is determined as the target TCI state.

Optionally, if the uplink signal is a PUCCH, determining the target TCI state for the uplink signal may include at least one of the following. A TCI state that is used for PUCCH transmission and activated via a MAC CE is determined as the target TCI state. If no MAC CE for activating a TCI state used for PUCCH transmission is received, A TCI state with the lowest TCI state ID among at least one TCI state configured via RRC is determined as the target TCI state.

Optionally, if the uplink signal is an SRS, determining the target TCI state for the uplink signal may include at least one of the following. A TCI state that is used for SRS transmission and configured via RRC is determined as the target TCI state. A TCI state that is used for SRS transmission and indicated via a MAC CE is determined as the target TCI state. A TCI state corresponding to a preset SRS resource in an SRS resource set that an SRS resource carrying the SRS belongs to is determined as the target TCI state.

In case the TCI state that is used for SRS transmission and indicated via a MAC CE is determined as the target TCI state, if the SRS is a semi-persistent SRS, the MAC CE is a MAC CE for activating the semi-persistent SRS.

In case the TCI state corresponding to one preset SRS resource in the SRS resource set that the SRS resource carrying the SRS belongs to is determined as the target TCI state, for SRSs transmitted on different SRS resources in one SRS resource set, the target TCI state is determined according to the TCI state corresponding to the preset SRS resource, that is, SRSs transmitted on different SRS resources correspond to the same target TCI state and thus the same power control parameter can be determined, thereby achieving a constant power for the SRS resource set.

Optionally, if the uplink signal is an aperiodic SRS, the target TCI state for the uplink signal may be determined as follows. A TCI state that is indicated via DCI used for triggering the aperiodic SRS is determined as the target TCI state.

Optionally, if the uplink signal is a PRACH, determining the target TCI state for the uplink signal may include one of the following. A TCI state that is used for PRACH transmission and configured via RRC is determined as the target TCI state. A TCI state that is used for PRACH transmission and indicated via a MAC CE is determined as the target TCI state.

In the above method for uplink power control parameter determination, according to a TCI state configured for an uplink signal, the terminal determines a power control parameter corresponding to the TCI state, thereby determining a transmit power of the uplink signal according to the power control parameter determined. The power control parameter may be indicated in various manners according to various types of the uplink signal. Based on these various indication manners, the terminal determines the power control parameter in various ways accordingly. Therefore, the terminal device can determine the power control parameter in various ways according to various types of the uplink signal, which is possible to determine different power control parameters if different transmit beams are used to transmit the uplink signal, thereby determining an appropriate transmit power for present transmission.

Figure 5:
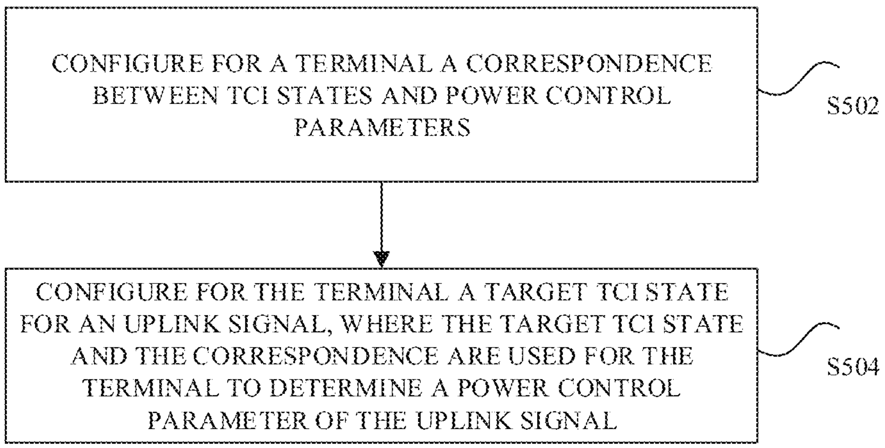
FIG. 5 is a schematic flowchart of method II for power control parameter determination provided in implementations of the disclosure.

Implementations of the disclosure further provide a method for power control parameter determination. FIG. 5 is a schematic flowchart of method II for power control parameter determination provided in implementations of the disclosure. As illustrated in FIG. 5, the method includes the following.

S502, a correspondence between TCI states and power control parameters is configured for a terminal.

S504, a target TCI state for an uplink signal is configured for the terminal, where the target TCI state and the correspondence are used for the terminal to determine a power control parameter of the uplink signal. The TCI state may include multiple pieces of information, for example, may include at least one of: a QCL type, a source reference signal (which may be, for example, a source reference signal ID), a reference serving cell, or a reference BWP. The power control parameter may also be of multiple types, for example, may include at least one of: a parameter used for determining a target receive power, a parameter used for determining a pathloss weight factor, a downlink reference signal used for pathloss measurement, or a parameter used for determining a closed-loop power control adjustment state.

Through the above operations, a network device can configure for the terminal the power control parameter of the uplink signal according to the target TCI state for the uplink signal configured for the terminal, such that the terminal can determine an appropriate transmit power to transmit the uplink signal. As such, it is possible to provide a standard for the network device to configure for the terminal the power control parameter of the uplink signal according to the TCI state, such that the terminal can transmit the uplink signal at an appropriate transmit power, which can meet requirements for development of technical standards.

As an optional implementation, the method can be executed by a network device. The network device may be the network device 110 described above.

As an optional implementation, the power control parameter of the uplink signal may be configured for the terminal according to the target TCI state in various manners. For example, if the correspondence between TCI states and power control parameters is configured for the terminal by the network device, the power control parameter of the uplink signal may be configured for the terminal according to the correspondence configured. For instance, the correspondence between TCI states and power control parameters is configured for the terminal, and the power control parameter of the uplink signal is configured for the terminal according to the target TCI state and the correspondence.

As an optional implementation, the correspondence may be determined in various manners. For example, the correspondence between TCI states and power control parameters may be configured for the terminal in at least one of the following manners.

(1) A power control parameter corresponding to a TCI state is contained in first higher-layer signaling used for configuring the TCI state. In other words, higher-layer signaling used by the network device to configure a TCI state for the terminal directly contains the TCI state and a power control parameter corresponding to the TCI state. It is to be noted that, the TCI state contained in the higher-layer signaling may be multiple TCI states, and therefore, the higher-layer signaling further contains power control parameters corresponding to the multiple TCI states respectively.

(2) The correspondence between TCI states and power control parameters is configured for the terminal by configuring, via second higher-layer signaling, a correspondence between TCI state IDs of TCI states and power control parameters. In other words, the network device configures for the terminal a correspondence between TCI state IDs and power control parameters, to configure for the terminal a correspondence between TCI states identified by the TCI state IDs and power control parameters.

(3) The correspondence between TCI states and power control parameters is configured for the terminal by configuring an initial correspondence between TCI states and power control parameters via RRC signaling and activating or updating the initial correspondence via a MAC CE. In other words, the initial correspondence is first configured via the RRC signaling and then activated or updated via the MAC CE, to obtain an activated or updated correspondence between TCI states and power control parameters. It is to be noted that, update of the initial correspondence may refer to update of TCI state or power control parameter, that is, the correspondence is updated as long as one of TCI state or power control parameter is updated.

It is to be noted that, the above manners of configuring the correspondence between TCI states and power control parameters for the terminal may be adopted flexibly according to actual needs, or may be adopted according to different signaling used for communication between the network device and the terminal.

Through the above operations, for a case where the correspondence between TCI states and power control parameters is configured for the terminal by the network device, and for a case where no correspondence between TCI states and power control parameters is configured for the terminal by the network device the power control parameter of the uplink signal is configured for the terminal respectively. In other words, no matter whether the correspondence is configured for the terminal by the network device, the network device can configure the power control parameter of the uplink signal for the terminal according to the target TCI state for the uplink signal, which is possible for the terminal to transmit the uplink signal at an appropriate transmit power.

As an optional implementation, if the uplink signal is an SRS and the power control parameter is a closed-loop power control adjustment state, the power control parameter of the uplink signal is configured for the terminal according to the target TCI state and the correspondence as follows. SRSs on different SRS resources in one SRS resource set have a same closed-loop power control adjustment state that is configured according to the target TCI state. Although different SRS resources in one SRS resource set may correspond to different target TCI states, closed-loop power control adjustment states determined according to these target TCI states and the correspondence between TCI states and power control parameters are the same. Through the above operations, one SRS resource set can be used for SRS transmission on one panel. One panel (corresponding to the same SRS resource set) adopts the same closed-loop power control adjustment state, and different panels adopt different closed-loop power control adjustment states, which can achieve separate SRS closed-loop power control on each panel.

As an optional implementation, the network device can further transmit a carrier set to the terminal, where at least one uplink signal on each carrier in the carrier set, which is of the same type as the uplink signal, also corresponds to or adopts the target TCI state; or at least one uplink signal on each carrier in the carrier set, which is of the same type as the uplink signal, corresponds to a TCI state with the same TCI state ID as the target TCI state. Through the above operations, few signaling indications are required by the network device to configure for the terminal power control parameters of uplink signals on multiple carriers, such that the terminal can determine an appropriate transmit power for an uplink signal on each carrier in the carrier set.

As an optional implementation, the target TCI state for the uplink signal can be configured for the terminal in various manners according to different uplink signals. The following will exemplify the uplink signal to be a PUSCH, a PUCCH, an SRS, and a PRACH respectively for illustration.

Optionally, if the uplink signal is a PUSCH, the target TCI state for the uplink signal may be configured for the terminal as follows. A TCI state indicated by TCI-state indication information in DCI used for scheduling the PUSCH is configured as the target TCI state.

The target TCI state is a TCI state indicated by the TCI-state indication information from at least one candidate TCI state that is used for PUSCH transmission and activated via a MAC CE.

If the uplink signal is a PUSCH, and DCI used for scheduling the PUSCH does not contain TCI-state indication information or a time interval between DCI used for scheduling the PUSCH and the PUSCH is less than a preset threshold value, configuring for the terminal the target TCI state for the uplink signal may include one of the following. A TCI state with the lowest TCI state ID among at least one candidate TCI state that is used for PUSCH transmission and activated via a MAC CE is configured as the target TCI state. A first candidate TCI state that is used for PUSCH transmission and activated via a MAC CE is configured as the target TCI state. A TCI state indicated by a minimum indication value of TCI-state indication information in the DCI is configured as the target TCI state. A TCI state with the lowest TCI state ID among at least one TCI state configured via RRC is configured as the target TCI state. A TCI state corresponding to a CORESET that a PDCCH carrying the DCI belongs to is configured as the target TCI state.

Optionally, if the uplink signal is a PUCCH, configuring for the terminal the target TCI state for the uplink signal may include at least one of the following. A TCI state that is used for PUCCH transmission and activated via a MAC CE is configured as the target TCI state. If no MAC CE for activating a TCI state used for PUCCH transmission is transmitted, a TCI state with the lowest TCI state ID among at least one TCI state configured via RRC is configured as the target TCI state.

Optionally, if the uplink signal is an SRS, configuring for the terminal the target TCI state for the uplink signal may include one of the following. A TCI state that is used for SRS transmission and configured via RRC is configured as the target TCI state. A TCI state that is used for SRS transmission and indicated via a MAC CE is configured as the target TCI state. A TCI state corresponding to a preset SRS resource in an SRS resource set that an SRS resource carrying the SRS belongs to is configured as the target TCI state.

In case the TCI state that is used for SRS transmission and indicated via a MAC CE is configured as the target TCI state, if the SRS is a semi-persistent SRS, the MAC CE is a MAC CE for activating the semi-persistent SRS.

In case the TCI state corresponding to one preset SRS resource in the SRS resource set that the SRS resource carrying the SRS belongs to is configured as the target TCI state, for SRSs transmitted on different SRS resources in one SRS resource set, the target TCI state is determined according to the TCI state corresponding to the preset SRS resource, that is, SRSs transmitted on different SRS resources correspond to the same target TCI state and thus the same power control parameter can be determined, thereby achieving a constant power for the SRS resource set.

Optionally, if the uplink signal is an aperiodic SRS, the target TCI state for the uplink signal is configured for the terminal as follows. A TCI state that is indicated via DCI used for triggering the aperiodic SRS is configured as the target TCI state.

Optionally, if the uplink signal is a PRACH, configuring for the terminal the target TCI state for the uplink signal includes one of the following. A TCI state that is used for PRACH transmission and configured via RRC is configured as the target TCI state. A TCI state that is used for PRACH transmission and indicated via a MAC CE is configured as the target TCI state.

In the above method for uplink power control parameter determination, according to a TCI state for an uplink signal configured for the terminal, the network device configures for the terminal a power control parameter of the uplink signal, such that the terminal can determine a transmit power of the uplink signal according to the power control parameter determined. The power control parameter may be indicated in various manners according to various types of the uplink signal, such that the terminal device can determine the power control parameter in various ways according to different uplink signals, which is possible for the terminal to determine different power control parameters if different transmit beams are used to transmit the uplink signal, thereby determining an appropriate transmit power for present transmission.

In connection with the foregoing implementations and preferable implementations, the following will describe specific embodiments in which the uplink signal is a PUSCH, a PUCCH, and an SRS respectively.

Embodiment 1: (PUSCH)

1. The terminal device determines a correspondence between at least one TCI state and PUSCH power control parameters according to higher-layer signaling.

Here, suppose that the at least one TCI state is M TCI states (M>=1). The correspondence may be determined in the following two manners.

Manner 1: The network device configures the M TCI states via the higher-layer signaling, where configuration information of each TCI state may include not only configuration of the TCI state (such as information of a QCL reference signal or the like) but also information of a corresponding power control parameter (such as a target receive power, a pathloss factor, a downlink reference signal used for pathloss measurement, and a closed-loop power control adjustment state index, etc.).

For example, configuration information of a TCI state configured via RRC may include the following (where the first four parameters are used for determining the QCL reference signal, and the last three parameters are the corresponding power control parameters):

```
TCI-State ::=                  SEQUENCE {
  tci-StateId                    TCI-StateId,
    cell                               ServCellIndex
OPTIONAL, -- Need R
    bwp-Id                               BWP-Id OPTIONAL, --
Cond CSI-RS-Indicated
    referenceSignal                  CHOICE {
        csi-rs                               NZP-CSI-RS-ResourceId,
        ssb                                      SSB-Index
      srs                        SRS-ResourceId
    },
    PathlossReferenceRS-Id    PathlossReferenceRS-Id,
    P0-AlphaSetId                P0- AlphaSetId,
    ClosedLoopIndex                ENUMERATED { i0, i1 },
    ...
}
```

Figure 6:
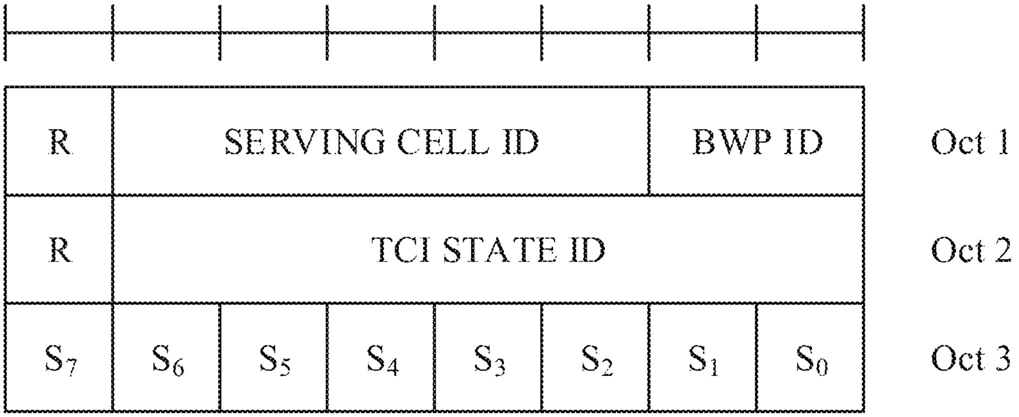
FIG. 6 is a schematic diagram illustrating update of a power control parameter corresponding to a TCI state via a media access control-control element (MAC CE) provided in implementations of the disclosure.

As an optional implementation, the network device may activate or update a power control parameter corresponding to any of the at least one TCI state via a MAC CE. FIG. 6 is a schematic diagram illustrating update of a power control parameter corresponding to a TCI state via a MAC CE provided in implementations of the disclosure. As illustrated in FIG. 6, a reference signal used for pathloss measurement (also known as pathloss reference signal) contained in configuration information of a TCI state may be updated via the following MAC CE.

Si corresponds to a pathloss reference signal (RS) preconfigured via RRC. An updated pathloss reference signal may be indicated via a bitmap, or a pathloss reference signal index or ID may be indicated directly.

As an optional implementation, the terminal device may receive a carrier set configured by the network device via higher-layer signaling. If any of the at least one TCI state is activated or updated by the network device via a MAC CE, a TCI state(s) on each carrier in the carrier set with the same TCI state ID as the activated/updated TCI state will also be activated/updated. This method may be used only to activate/update a TCI state on a BWP on each carrier with the same BWP ID as a BWP that the PUSCH belongs to, or may be used only to activate/update a TCI state on a currently activated BWP on each carrier.

Manner 2: The network device configures the M TCI states via the higher-layer signaling, and then configures, via another higher-layer signaling, power control parameters corresponding to each of the M TCI states. Specifically, the network device may configure a power control parameter corresponding to each TCI state ID.

For example, RRC signaling used for configuring a TCI state is as follows:

```
TCI-State ::=                      SEQUENCE {
  tci-StateId                        TCI-StateId,
    cell                                 ServCellIndex
    OPTIONAL, -- Need R
    bwp-Id                                   BWP-Id
    OPTIONAL, -- Cond CSI-RS-Indicated
      referenceSignal              CHOICE {
          csi-rs                             NZP-CSI-RS-ResourceId,
          ssb                                    SSB-Index
        srs                      SRS-ResourceId
      },
      ...
}
```

For example, RRC signaling used for configuring a power control parameter corresponding to a TCI state is as follows (where the last three parameters are power control parameters corresponding to a TCI state indicated by TCI-StateId, and each TCI state corresponds to one TCI-PowerControl field). Such indication information may be applied only to a PUSCH and a PUCCH rather than an SRS, that is, for an SRS, an existing SRS resource set-based power control parameter configuration manner is adopted regardless of TCI state; or the indication information may be applied to various types of uplink signal.

```
TCI-PowerControl ::=             SEQUENCE {
  tci-PowerControlId                 TCI-StateId,
  tci-PathlossReferenceRS-Id       PathlossReferenceRS-Id,
  tci-P0-AlphaSetId                    P0-AlphaSetId,
  tci-ClosedLoopIndex                    ENUMERATED { i0, i1 }
```

Similarly, via a MAC CE, the network device may also activate or update a power control parameter corresponding to any one TCI state ID.

In implementations of the disclosure, the TCI state may include at least one of the following: a QCL type, a reference signal (which may be, for example, a reference signal ID), a reference serving cell, or a reference BWP (which may be, for example, a BWP ID).

For example, the QCL type may include one of multiple QCL types agreed between the terminal device and a network, for example, may at least include one of the following QCL types:

1. QCL type X: spatial transmission (Tx) parameter;
2. QCL type Y: spatial transmission filter;
3. QCL type Z: panel.

The first two types are used for determining a transmit beam, and the third type is used for determining a panel used for transmission.

For example, the terminal and the network device reach an agreement on the QCL type (which is, for example, QCL type X). In this case, the TCI state does not have to contain indication information of the QCL type.

For example, the reference signal ID may be used for determining a QCL reference signal for the uplink signal, such as a reference signal used for determining a transmit beam or transmit panel of the uplink signal. The terminal device may determine the transmit beam of the uplink signal according to a transmit beam or receive beam of the reference signal.

For example, the reference serving cell and the reference BWP ID may be used for determining a carrier and a BWP that a reference signal indicated by a reference signal ID belongs to.

In implementations of the disclosure, the power control parameter includes at least one of: a parameter used for determining target receive power $P_0$, a parameter used for determining pathloss weight factor a, a reference signal used for pathloss measurement, or an index of a closed-loop power control process.

For example, the parameter used for determining target receive power $P_0$ and the parameter used for determining pathloss weight factor a may be determined according to the same parameter set (for example, a P0-AlphaSet corresponding to P0-AlphaSetId above may contain the two parameters).

For example, the reference signal used for pathloss measurement may be an SSB or a CSI-RS.

For example, the index of a closed-loop power control process may be one of the values of l agreed between the terminal and the network device, such as 0-1 or 0-3.

2. The terminal device determines a power control parameter of the PUSCH according to a target TCI state configured for the PUSCH and the correspondence, where the M TCI states include the target TCI state.

In implementations of the disclosure, according to the target TCI state and the correspondence, the terminal determines a power control parameter corresponding to the target TCI state as the power control parameter of the PUSCH.

The terminal may determine the target TCI state in manner 1 below.

(1) Determine the M TCI states and the correspondence between at least one TCI state and PUSCH power control parameters according to RRC signaling transmitted by the network device;

(2) Activate, via a MAC CE, K TCI states from the M TCI states in order for PUSCH transmission, where K≤M.

(3) Determine a target TCI state from the K TCI states according to TCI-state indication information in DCI, where each indication value of the TCI-state indication information corresponds to one or more TCI states among the K TCI states. If no MAC CE is transmitted by the network device, the TCI-state indication information is used for determining the target TCI state from the M TCI states.

It is to be noted that, manner 1 can be applied to a case where DCI for scheduling the PUSCH contains the TCI-state indication information, such as DCI format 0_1. Optionally, a time interval between the DCI and the PUSCH is required to be greater than or equal to a certain threshold value, where the threshold value may be reported by the terminal or configured by the network device.

The terminal may determine the target TCI state in manner 2 below.

The target TCI state is a TCI state with the lowest TCI state ID among K TCI states that are used for PUSCH transmission and activated via a MAC CE, or a first TCI state among TCI states that are used for PUSCH transmission and activated via a MAC CE, or a TCI state indicated by a minimum value of TCI-state indication information (which is, for example, 000 if the information has 3 bits), or a TCI state with the lowest TCI state ID among M TCI states configured via RRC, or a TCI state corresponding to a CORESET that a PDCCH carrying DCI belongs to.

It is to be noted that, manner 2 can be applied to a case where DCI for scheduling the PUSCH does not contain TCI-state indication information, or a case where a time interval between the DCI and the PUSCH is less than a certain threshold value, where the threshold value may be reported by the terminal or configured by the network device.

In implementations of the disclosure, if no correspondence between TCI states and PUSCH power control parameters is configured for the terminal, for example, no corresponding RRC parameter is received by the terminal, the terminal device may determine a power control parameter with the lowest index in a candidate set of power control parameters configured by the network device as the power control parameter of the PUSCH. For example, the terminal device may adopt a reference signal used for pathloss measurement corresponding to PathlossReferenceRS-Id=0, adopt a parameter in P0-AlphaSet corresponding to P0-AlphaSetId=0 to determine P0 and alpha, and adopt a closed-loop power control process corresponding to close loop index=0.

In implementations of the disclosure, the power control parameter of the PUSCH may be elaborated as follows.

For example, if a QCL reference signal indicated by the target TCI state is an uplink signal (such as SRS), the power control parameter of the PUSCH determined according to the disclosure is the same as a power control parameter of the QCL reference signal indicated by the target TCI state. The power control parameter herein may include only a pathloss reference signal (RS), or may also include other power control parameters.

For example, if the power control parameter is a downlink reference signal used for pathloss measurement, and a QCL reference signal indicated by the target TCI state is a downlink signal, a reference signal used for pathloss measurement of the PUSCH is the same as the QCL reference signal indicated by the target TCI state.

Embodiment 2: (PUCCH)

1. The terminal device determines a correspondence between at least one TCI state and PUCCH power control parameters via higher-layer signaling.

For the specific configuration manner, reference can be made to embodiment 1 described above.

2. According to a target TCI state configured for the PUCCH and the correspondence, the terminal device determines a power control parameter corresponding to the target TCI state as a power control parameter of the PUCCH.

As an optional implementation, the terminal device can determine M TCI states via RRC signaling, and activates, via a MAC CE, one of the M TCI states used for PUCCH transmission as the target TCI state. The MAC CE may carry a TCI state ID corresponding to the target TCI state (referred to as a target TCI state ID).

As an optional implementation, if no MAC CE for activating a TCI state is received by the terminal, the target TCI state is a preset TCI state, which may be, for example, a TCI state with the lowest TCI state ID (such as a TCI state corresponding to TCI state ID=0) among M TCI states configured via RRC.

As an optional implementation, if no correspondence between TCI states and PUCCH power control parameters is configured for the terminal, for example, no corresponding RRC parameter is received by the terminal, the terminal device may determine a power control parameter with the lowest index in a candidate set of power control parameters configured by the network device as the power control parameter of the PUCCH. For example, the terminal device may adopt a reference signal used for pathloss measurement corresponding to PathlossReferenceRS-Id=0, adopt a parameter in P0-Set corresponding to P0-SetId=0 to determine P0, and adopt a closed-loop power control process corresponding to close loop index=0.

In implementations of the disclosure, the power control parameter of the PUCCH may be elaborated as follows.

For example, if a QCL reference signal indicated by the target TCI state is an uplink signal (such as SRS), the power control parameter of the PUCCH determined according to the disclosure is the same as a power control parameter of the QCL reference signal indicated by the target TCI state. The power control parameter herein may include only a pathloss reference signal (RS) or may also include other power control parameters.

For example, if the power control parameter is a downlink reference signal used for pathloss measurement, and a QCL reference signal indicated by the target TCI state is a downlink signal, a reference signal used for pathloss measurement of the PUCCH is the same as the QCL reference signal indicated by the target TCI state.

As an optional implementation, the terminal device may receive a carrier set configured via higher-layer signaling. After a MAC CE for activating a target TCI state (an ID of the TCI state is referred to as a target TCI state ID) used for PUCCH transmission is received by the terminal, a PUCCH on a target BWP on each carrier in the carrier set corresponding to the same PUCCH resource (or the same PUCCH resource ID) as the PUCCH corresponds to the activated target TCI state, or a PUCCH on a target BWP on each carrier in the carrier set corresponding to the same PUCCH resource (or the same PUCCH resource ID) as the PUCCH corresponds to the target TCI state ID to obtain the target TCI state, thereby determining its power control parameter. The target BWP is a BWP with the same BWP ID as a BWP that the PUCCH belongs to, or a currently activated BWP on each carrier.

Embodiment 3: (SRS)

1. The terminal device determines a correspondence between at least one TCI state and SRS power control parameters via higher-layer signaling.

For the specific configuration manner, reference can be made to embodiment 1 described above.

2. According to a target TCI state configured for the SRS and the correspondence, the terminal device determines a power control parameter of the SRS, where the at least one TCI state includes the target TCI state.

As an optional implementation, one of the following methods can be adopted.

Method 1: The target TCI state is a TCI state that is used for SRS transmission and configured via RRC, or a TCI state that is used for SRS transmission and indicated via a MAC CE, or a TCI state corresponding to a preset SRS resource in an SRS resource set that an SRS resource carrying the SRS belongs to.

The MAC CE may carry a TCI state ID corresponding to the target TCI state (referred to as a target TCI state ID).

The preset SRS resource in the SRS resource set that the SRS resource carrying the SRS belongs to may be an earliest transmitted SRS resource in the SRS resource set, or an SRS resource with the lowest SRS resource ID in the SRS resource set. The terminal may determine a TCI state configured for the preset SRS resource by the network device as the target TCI state, thereby determining the power control parameter of the SRS.

All SRS resources in the SRS resource set use a TCI state corresponding to the preset SRS resource as the target TCI state, and accordingly, the same power control parameter is determined.

For example, the terminal device may determine a power control parameter corresponding to the TCI state configured for the preset SRS resource by the network device as a power control parameter of all the SRS resources in the SRS resource set.

Method 2: The uplink signal is a semi-persistent SRS. In this case, the target TCI state is a TCI state that is used for SRS transmission and indicated via a MAC CE used for activating the SRS.

Method 3: The uplink signal is an aperiodic SRS. In this case, the target TCI state is a TCI state that is indicated via DCI used for triggering the aperiodic SRS. Specifically, the target TCI state may be indicated via TCI-state indication information in the DCI, or may be indicated via SRS-triggering signaling in the DCI.

As an optional implementation, if no correspondence between TCI states and SRS power control parameters is configured for the terminal, for example, no corresponding RRC parameter is received by the terminal, the terminal device determines a power control parameter with the lowest index in a candidate set of power control parameters configured by the network device as the power control parameter of the SRS. For example, the terminal device may adopt a reference signal used for pathloss measurement corresponding to PathlossReferenceRS-Id=0, adopt a parameter in P0-AlphaSet corresponding to P0-AlphaSetId=0 to determine P0 and alpha, and adopt a closed-loop power control process corresponding to close loop index=0.

In implementations of the disclosure, the power control parameter of the SRS may be elaborated as follows. For the specific implementation thereof, reference can be made to embodiment 2.

As an optional implementation, the terminal device can receive a carrier set configured via higher-layer signaling. After a MAC CE for activating a target TCI state (an ID of the TCI state is referred to as a target TCI state ID) used for SRS transmission is received by the terminal, an SRS resource on a target BWP on each carrier in the carrier set corresponding to the same SRS resource ID as an SRS resource carrying the SRS corresponds to the activated target TCI state, or an SRS resource on a target BWP on each carrier in the carrier set corresponding to the same SRS resource ID as an SRS resource carrying the SRS corresponds to the target TCI state ID to obtain its target TCI state, thereby determining its power control parameter. The target BWP is a BWP with the same BWP ID as a BWP that the SRS belongs to, or a currently activated BWP on each carrier.

According to the above embodiments, the terminal can determine a power control parameter according to a TCI state configured by the network device, and for different types of uplink signal, the power control parameter can be determined in different manners. As such, it is possible to determine different power control parameters if different transmit beams are used to transmit an uplink signal, thereby determining an appropriate transmit power for present transmission.

It should be understood that, in various implementations of the disclosure, the magnitude of a sequence number of each process does not mean an order of execution, and the order of execution of each process should be determined by its function and an internal logic and shall not constitute any limitation to an implementation process of implementations of the disclosure.

The method for power control parameter determination according to implementations of the disclosure has been described in detail above in connection with FIG. 1 to FIG. 6. The following will describe a terminal and a network device according to implementations of the disclosure in connection with FIG. 7 to FIG. 9.

Figure 7:
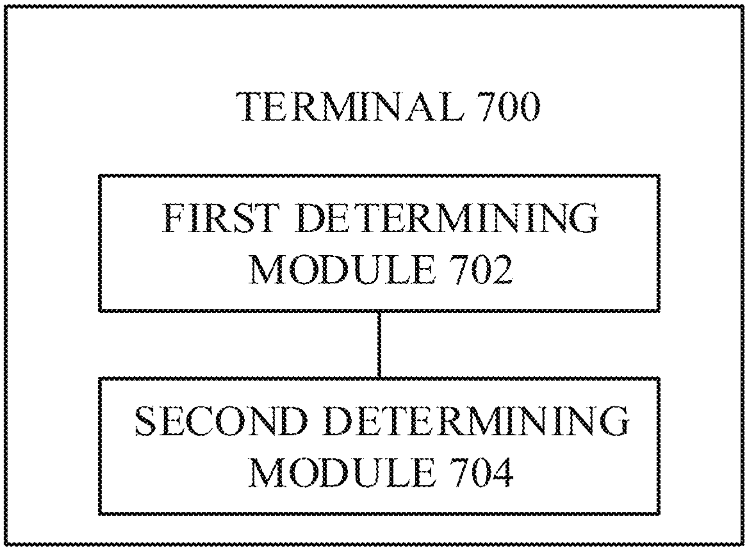
FIG. 7 is a schematic block diagram of a terminal provided in implementations of the disclosure.

FIG. 7 is a schematic block diagram of a terminal provided in implementations of the disclosure. As illustrated in FIG. 7, the terminal 700 includes a first determining module 702 and a second determining module 704. This terminal will be elaborated below.

The first determining module 702 is configured to determine a target TCI state for an uplink signal. The second determining module 704 is coupled with the first determining module 702 and configured to determine a power control parameter of the uplink signal according to the target TCI state.

Optionally, as an implementation, the power control parameter of the uplink signal is determined according to the target TCI state as follows. The power control parameter of the uplink signal is determined according to the target TCI state and a correspondence between TCI states and power control parameters.

Optionally, as an implementation, the following can be performed. The correspondence between TCI states and power control parameters is determined in at least one of the following manners. A power control parameter corresponding to a TCI state is contained in first higher-layer signaling used for configuring the TCI state. A correspondence between TCI state IDs of TCI states and power control parameters that is configured via second higher-layer signaling is received, and the correspondence between TCI states and power control parameters is determined according to the correspondence. The correspondence between TCI states and power control parameters is determined according to RRC signaling and a MAC CE, where the RRC signaling is used for configuring an initial correspondence between TCI states and power control parameters, and the MAC CE is used for activating or updating the initial correspondence.

Optionally, as an implementation, the following can be performed. If no signaling used for configuring the correspondence between TCI states and power control parameters is received, a power control parameter with the lowest index in a candidate set of power control parameters is determined as the power control parameter of the uplink signal.

Optionally, as an implementation, the power control parameter of the uplink signal is determined according to the target TCI state as follows. If a source reference signal indicated by the target TCI state is an uplink reference signal, a power control parameter of the source reference signal indicated by the target TCI state is determined as the power control parameter of the uplink signal.

Optionally, as an implementation, the power control parameter of the uplink signal is determined according to the target TCI state as follows. When a source reference signal indicated by the target TCI state is a downlink reference signal and the power control parameter is a downlink reference signal used for pathloss measurement, the source reference signal indicated by the target TCI state is determined as the power control parameter of the uplink signal.

Optionally, as an implementation, if the uplink signal is an SRS and the power control parameter is a closed-loop power control adjustment state, the power control parameter of the uplink signal is determined according to the target TCI state as follows. SRSs on different SRS resources in one SRS resource set have a same closed-loop power control adjustment state that is determined according to the target TCI state.

Optionally, as an implementation, the following can be performed. A carrier set configured by a network device is received, where at least one uplink signal on each carrier in the carrier set that is of the same type as the uplink signal also corresponds to the target TCI state, or at least one uplink signal on each carrier in the carrier set that is of the same type as the uplink signal corresponds to a TCI state with the same TCI state ID as the target TCI state.

Optionally, as an implementation, if the uplink signal is a PUSCH, the target TCI state for the uplink signal is determined as follows. Determine that the target TCI state is a TCI state indicated by TCI-state indication information in DCI used for scheduling the PUSCH.

Optionally, as an implementation, the target TCI state is a TCI state indicated by the TCI-state indication information from at least one candidate TCI state that is used for PUSCH transmission and activated via a MAC CE.

Optionally, as an implementation, if the uplink signal is a PUSCH, and DCI used for scheduling the PUSCH does not contain TCI-state indication information or a time interval between DCI used for scheduling the PUSCH and the PUSCH is less than a preset threshold value, determining the target TCI state for the uplink signal includes one of the following. Determine that the target TCI state is a TCI state with the lowest TCI state ID among at least one candidate TCI state that is used for PUSCH transmission and activated via a MAC CE. Determine that the target TCI state is a first candidate TCI state that is used for PUSCH transmission and activated via a MAC CE. Determine that the target TCI state is a TCI state indicated by a minimum indication value of TCI-state indication information in the DCI. Determine that the target TCI state is a TCI state with the lowest TCI state ID among at least one TCI state configured via RRC. Determine that the target TCI state is a TCI state corresponding to a CORESET that a PDCCH carrying the DCI belongs to.

Optionally, as an implementation, if the uplink signal is a PUCCH, determining the target TCI state for the uplink signal includes at least one of the following. Determine that the target TCI state is a TCI state that is used for PUCCH transmission and activated via a MAC CE. If no MAC CE for activating a TCI state used for PUCCH transmission is received, determine that the target TCI state is a TCI state with the lowest TCI state ID among at least one TCI state configured via RRC.

Optionally, as an implementation, if the uplink signal is an SRS, determining the target TCI state for the uplink signal includes at least one of the following. Determine that the target TCI state is a TCI state that is used for SRS transmission and configured via RRC. Determine that the target TCI state is a TCI state that is used for SRS transmission and indicated via a MAC CE. Determine that the target TCI state is a TCI state corresponding to a preset SRS resource in an SRS resource set that an SRS resource carrying the SRS belongs to.

Optionally, as an implementation, if the SRS is a semi-persistent SRS, the MAC CE is a MAC CE for activating the semi-persistent SRS.

Optionally, as an implementation, if the uplink signal is an aperiodic SRS, the target TCI state for the uplink signal is determined as follows. Determine that the target TCI state is a TCI state that is indicated via DCI used for triggering the aperiodic SRS.

Optionally, as an implementation, if the uplink signal is a PRACH, determining the target TCI state for the uplink signal includes one of the following. Determine that the target TCI state is a TCI state that is used for PRACH transmission and configured via RRC. Determine that the target TCI state is a TCI state that is used for PRACH transmission and indicated via a MAC CE.

Optionally, as an implementation, the TCI state includes at least one of: a QCL type, a source reference signal, a reference serving cell, or a reference BWP.

Optionally, as an implementation, the power control parameter includes at least one of: a parameter used for determining a target receive power, a parameter used for determining a pathloss weight factor, a downlink reference signal used for pathloss measurement, or a parameter used for determining a closed-loop power control adjustment state.

It should be understood that, the above and other operations and/or functions of various units of the terminal according to implementations of the disclosure are respectively intended to realize corresponding operations performed by a terminal in various methods illustrated in FIG. 1 to FIG. 6, which will not be elaborated again herein for the sake of brevity.

Figure 8:
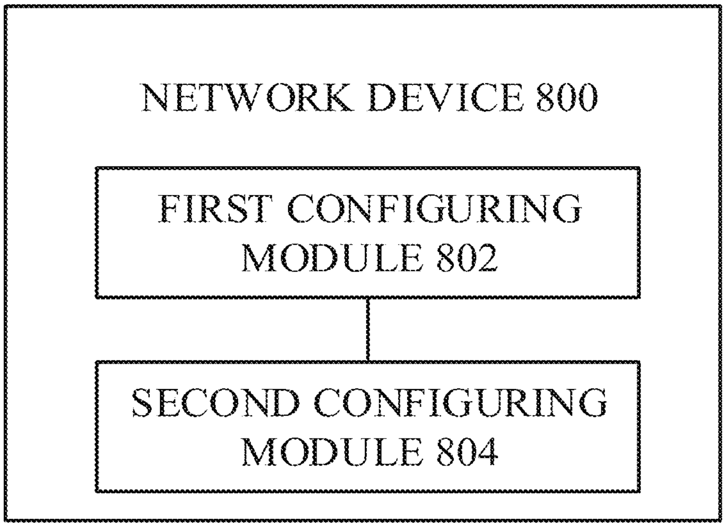
FIG. 8 is a schematic block diagram of a network device provided in implementations of the disclosure.

FIG. 8 is a schematic block diagram of a network device provided in implementations of the disclosure. As illustrated in FIG. 8, the network device 800 includes a first configuring module 802 and a second configuring module 804. The network device will be elaborated below.

The first configuring module 802 is configured to configure for a terminal a correspondence between TCI states and power control parameters. The second configuring module 804 is coupled with the first configuring module 802 and configured to configure for the terminal a target TCI state for an uplink signal, where the target TCI state and the correspondence are used for the terminal to determine a power control parameter of the uplink signal.

Optionally, as an implementation, the power control parameter of the uplink signal is configured for the terminal according to the target TCI state as follows. The correspondence between TCI states and power control parameters is configured for the terminal. The power control parameter of the uplink signal is configured for the terminal according to the target TCI state and the correspondence.

Optionally, as an implementation, the correspondence between TCI states and power control parameters is configured for the terminal in one of the following manners. A power control parameter corresponding to a TCI state is contained in first higher-layer signaling used for configuring the TCI state. The correspondence between TCI states and power control parameters is configured for the terminal by configuring, via second higher-layer signaling, a correspondence between TCI state IDs of TCI states and power control parameters. The correspondence between TCI states and power control parameters is configured for the terminal by configuring an initial correspondence between TCI states and power control parameters via RRC signaling and activating or updating the initial correspondence via a MAC CE.

Optionally, as an implementation, if the uplink signal is an SRS and the power control parameter is a closed-loop power control adjustment state, the power control parameter of the uplink signal is configured for the terminal according to the target TCI state as follows. SRSs on different SRS resources in one SRS resource set have a same closed-loop power control adjustment state that is configured according to the target TCI state.

Optionally, as an implementation, the following can be performed. A carrier set is transmitted to the terminal, where at least one uplink signal on each carrier in the carrier set that is of the same type as the uplink signal also corresponds to the target TCI state, or at least one uplink signal on each carrier in the carrier set that is of the same type as the uplink signal corresponds to a TCI state with the same TCI state ID as the target TCI state.

Optionally, as an implementation, if the uplink signal is a PUSCH, the target TCI state for the uplink signal is configured for the terminal as follows. A TCI state indicated by TCI-state indication information in DCI used for scheduling the PUSCH is configured as the target TCI state.

Optionally, as an implementation, the target TCI state is a TCI state indicated by the TCI-state indication information from at least one candidate TCI state that is used for PUSCH transmission and activated via a MAC CE.

Optionally, as an implementation, if the uplink signal is a PUSCH, and DCI used for scheduling the PUSCH does not contain TCI-state indication information or a time interval between DCI used for scheduling the PUSCH and the PUSCH is less than a preset threshold value, configuring for the terminal the target TCI state for the uplink signal includes one of the following. A TCI state with the lowest TCI state ID among at least one candidate TCI state that is used for PUSCH transmission and activated via a MAC CE is configured as the target TCI state. A first candidate TCI state that is used for PUSCH transmission and activated via a MAC CE is configured as the target TCI state. A TCI state indicated by a minimum indication value of TCI-state indication information in the DCI is configured as the target TCI state. A TCI state with the lowest TCI state ID among at least one TCI state configured via RRC is configured as the target TCI state. A TCI state corresponding to a CORESET that a PDCCH carrying the DCI belongs to is configured as the target TCI state.

Optionally, as an implementation, if the uplink signal is a PUCCH, configuring for the terminal the target TCI state for the uplink signal includes at least one of the following. A TCI state that is used for PUCCH transmission and activated via a MAC CE is configured as the target TCI state. If no MAC CE for activating a TCI state used for PUCCH transmission is transmitted, a TCI state with the lowest TCI state ID among at least one TCI state configured via RRC is configured as the target TCI state.

Optionally, as an implementation, if the uplink signal is an SRS, configuring for the terminal the target TCI state for the uplink signal includes one of the following. A TCI state that is used for SRS transmission and configured via RRC is configured as the target TCI state. A TCI state that is used for SRS transmission and indicated via a MAC CE is configured as the target TCI state. A TCI state corresponding to a preset SRS resource in an SRS resource set that an SRS resource carrying the SRS belongs to is configured as the target TCI state.

Optionally, as an implementation, if the SRS is a semi-persistent SRS, the MAC CE is a MAC CE for activating the semi-persistent SRS.

Optionally, as an implementation, if the uplink signal is an aperiodic SRS, the target TCI state for the uplink signal is configured for the terminal as follows. A TCI state that is indicated via DCI used for triggering the aperiodic SRS is configured as the target TCI state.

Optionally, as an implementation, if the uplink signal is a PRACH, configuring for the terminal the target TCI state for the uplink signal includes one of the following. A TCI state that is used for PRACH transmission and configured via RRC is configured as the target TCI state. A TCI state that is used for PRACH transmission and indicated via a MAC CE is configured as the target TCI state.

Optionally, as an implementation, the TCI state includes at least one of: a QCL type, a source reference signal, a reference serving cell, or a reference BWP.

Optionally, as an implementation, the power control parameter includes at least one of: a parameter used for determining a target receive power, a parameter used for determining a pathloss weight factor, a downlink reference signal used for pathloss measurement, or a parameter used for determining a closed-loop power control adjustment state.

It should be understood that, the above and other operations and/or functions of various units of the network device according to implementations of the disclosure are respectively intended to realize corresponding operations performed by a network device in various methods illustrated in FIG. 1 to FIG. 6, which will not be elaborated again herein for the sake of brevity.

Figure 9:
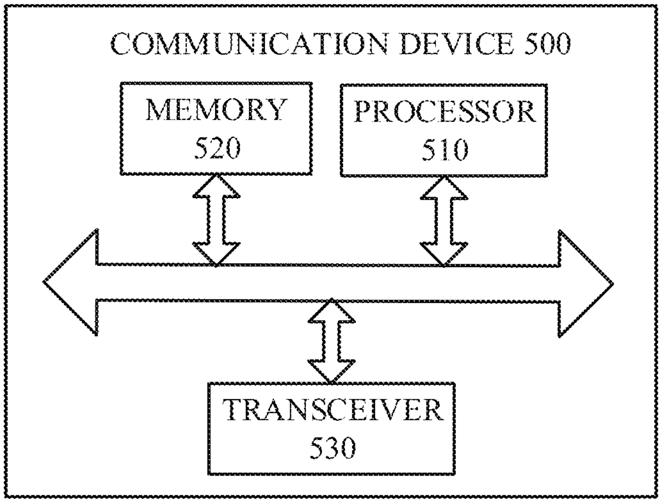
FIG. 9 is a schematic structural diagram of a communication device 500 provided in implementations of the disclosure.

FIG. 9 is a schematic structural diagram of a communication device 500 provided in implementations of the disclosure. The communication device 500 illustrated in FIG. 9 includes a processor 510. The processor 510 can invoke and execute computer programs stored in a memory to perform the method in implementations of the disclosure.

Optionally, as illustrated in FIG. 9, the communication device 500 can further include the memory 520. The processor 510 can invoke and execute the computer programs stored in the memory 520 to perform the method in implementations of the disclosure.

The memory 520 may be a separate device independent of the processor 510, or may be integrated into the processor 510.

Optionally, as illustrated in FIG. 9, the communication device 500 can further include a transceiver 530. The processor 510 can control the transceiver 530 to communicate with other devices, for example, to transmit information or data to other devices, or to receive information or data transmitted by other devices.

The transceiver 530 may include a transmitter and a receiver. The transceiver 530 may further include an antenna, where one or more antennas can be provided.

Optionally, the communication device 500 may be operable as the network device of implementations of the disclosure, and the communication device 500 can implement the corresponding operations performed by the network device described in various methods of implementations of the disclosure, which will not be elaborated again herein for the sake of simplicity.

Optionally, the communication device 500 may be operable as the mobile terminal/the terminal device of implementations of the disclosure, and the communication device 500 can implement the corresponding operations performed by the mobile terminal/the terminal device described in various methods of implementations of the disclosure, which will not be elaborated again herein for the sake of simplicity.

Figure 10:
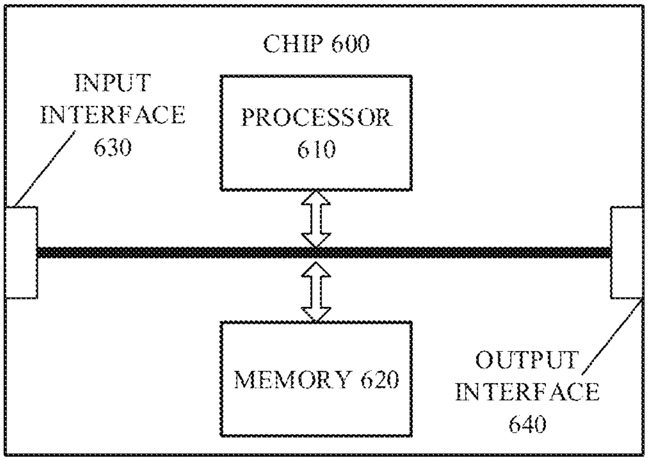
FIG. 10 is a schematic structural diagram of a chip provided in implementations of the disclosure.

FIG. 10 is a schematic structural diagram of a chip provided in implementations of the disclosure. The chip 600 illustrated in FIG. 10 includes a processor 610. The processor 610 is configured to invoke and execute computer programs stored in a memory to perform the method in implementations of the disclosure.

Optionally, as illustrated in FIG. 10, the chip 600 further includes the memory 620. The processor 610 can invoke and execute the computer programs stored in the memory 620 to perform the method in implementations of the disclosure.

The memory 620 may be a separate device independent of the processor 610, or may be integrated into the processor 610.

Optionally, the chip 600 may further include an input interface 630. The processor 610 can control the input interface 630 to communicate with other devices or chips, specifically, to acquire information or data transmitted by other devices or chips.

Optionally, the chip 600 may further include an output interface 640. The processor 610 can control the output interface 640 to communicate with other devices or chips, specifically, to output information or data to other devices or chips.

Optionally, the chip is applicable to the network device of implementations of the disclosure. The chip can implement the corresponding operations performed by the network device described in various methods of implementations of the disclosure, which will not be elaborated again herein for the sake of simplicity.

Optionally, the chip is applicable to the mobile terminal/the terminal device of implementations of the disclosure. The chip can implement the corresponding operations performed by the mobile terminal/the terminal device described in various methods of implementations of the disclosure, which will not be elaborated again herein for the sake of simplicity.

It should be understood that, the chip mentioned in implementations of the disclosure may also be referred to as a system-on-chip (SOC).

Figure 11:
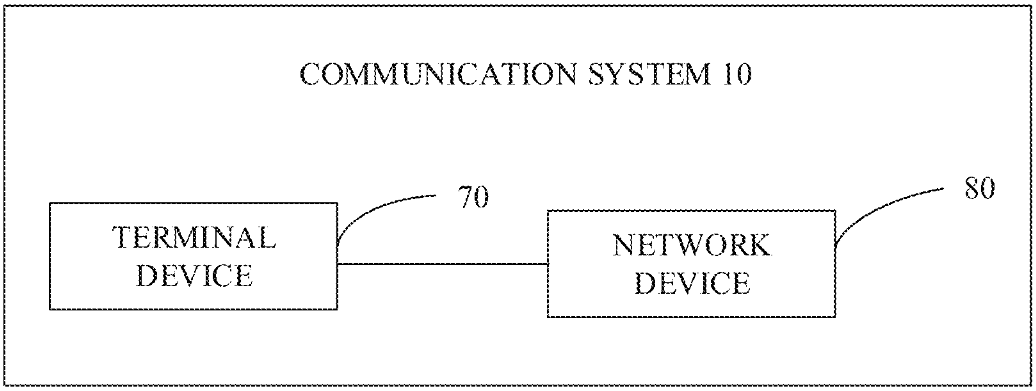
FIG. 11 is a schematic block diagram of a communication system 700 provided in implementations of the disclosure.

FIG. 11 is a schematic block diagram of a communication system 10 provided in implementations of the disclosure. As illustrated in FIG. 11, the communication system 10 includes a terminal device 700 and a network device 800.

The terminal device 700 can implement corresponding functions in the foregoing method which are implemented by a terminal device, and the network device 800 can implement corresponding functions in the foregoing method which are implemented by a network device, which will not be elaborated again herein for the sake of simplicity.

It should be understood that, the processor in implementations of the disclosure may be an integrated circuit chip with signal processing capabilities. During implementation, each step of the foregoing method implementations may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or execute the methods, steps, and logic blocks disclosed in implementations of the disclosure. The general purpose processor may be a microprocessor, or the processor may be any conventional processor or the like.

The steps of the method disclosed in implementations of the disclosure may be implemented directly by a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware of the processor.

It can be understood that, the memory in implementations of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or a flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (synchlink DRAM, SLDRAM), and a direct rambus RAM (DRRAM). It is to be noted that, the memory of the systems and methods described in the disclosure is intended to include, but is not limited to, these and any other suitable types of memory.

It should be understood that, the memory described above is intended for illustration rather than limitation. For example, the memory of implementations of the disclosure may also be an SRAM, a DRAM, an SDRAM, a DDR SDRAM, an ESDRAM, an SLDRAM, a DR RAM, etc. In other words, the memory of implementations of the disclosure is intended to include, but is not limited to, these and any other suitable types of memory.

Implementations of the disclosure further provide a computer readable storage medium. The computer readable storage medium is configured to store computer programs.

Optionally, the computer readable storage medium is applicable to the network device of implementations of the disclosure. The computer programs are operable with a computer to implement the corresponding operations performed by the network device described in various methods of implementations of the disclosure, which will not be elaborated again herein for the sake of simplicity.

Optionally, the computer readable storage medium is applicable to the mobile terminal/the terminal device of implementations of the disclosure. The computer programs are operable with a computer to implement the corresponding operations performed by the mobile terminal/the terminal device described in various methods of implementations of the disclosure, which will not be elaborated again herein for the sake of simplicity.

Implementations of the disclosure further provide a computer program product. The computer program product includes computer program instructions.

Optionally, the computer program product is applicable to the network device of implementations of the disclosure. The computer program instructions are operable with a computer to implement the corresponding operations performed by the network device described in various methods of implementations of the disclosure, which will not be elaborated again herein for the sake of simplicity.

Optionally, the computer program product is applicable to the mobile terminal/the terminal device of implementations of the disclosure. The computer program instructions are operable with a computer to implement the corresponding operations performed by the mobile terminal/the terminal device described in various methods of implementations of the disclosure, which will not be elaborated again herein for the sake of simplicity.

Implementations of the disclosure further provide a computer program.

Optionally, the computer program is applicable to the network device of implementations of the disclosure. The computer program, when executed by a computer, is operable with the computer to implement the corresponding operations performed by the network device described in various methods of implementations of the disclosure, which will not be elaborated again herein for the sake of simplicity.

Optionally, the computer program is applicable to the mobile terminal/the terminal device of implementations of the disclosure. The computer program, when executed by a computer, is operable with the computer to implement the corresponding operations performed by the mobile terminal/the terminal device described in various methods of implementations of the disclosure, which will not be elaborated again herein for the sake of simplicity.

Those of ordinary skill in the art will appreciate that units and algorithmic operations of various examples described in connection with implementations disclosed in the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be elaborated again herein.

It will be appreciated that the systems, apparatuses, and methods disclosed in implementations of the disclosure may also be implemented in various other manners. For example, the above apparatus implementations are merely illustrative, e.g., the division of units is only a division of logical functions, and other manners of division may also be available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interface, device or unit, and may be electrical, mechanical, or otherwise.

Units illustrated as separated components may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various implementations of the disclosure may be integrated into one processing unit or may be present as a number of physically separated units, and two or more units may be integrated into one.

If the function is implemented as software functional units and sold or used as standalone products, it may be stored in a computer readable storage medium. Based on such an understanding, the essential technical solution of the disclosure, or the portion that contributes to the prior art, or part of the technical solution may be embodied as software products. The computer software products can be stored in a storage medium and may include multiple instructions that, when executed, can cause a computer device, e.g., a personal computer, a server, a network device, etc., to execute some or all operations of the methods described in various implementations of the disclosure. The above storage medium may include various kinds of media that can store program codes, such as a universal serial bus (USB) flash disk, a mobile hard drive, a ROM, a RAM, a magnetic disk, or an optical disk, etc.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for power control parameter determination, comprising:

receiving radio resource control (RRC) signaling, wherein the RRC signaling comprises a correspondence between M transmission configuration indication (TCI) states and power control parameters, M being an integer and M>=1; wherein each of the M TCI states comprises: a quasi co-location (QCL) type, a source reference signal, a reference serving cell, and a reference bandwidth part (BWP); wherein each of the power control parameters comprises: a parameter used for determining a target receive power, a parameter used for determining a pathloss weight factor, and a parameter used for determining a closed-loop power control adjustment state;

activating, via a media access control-control element (MAC CE), K TCI states from the M TCI states, K≤M;

determining a target TCI state for a physical uplink shared channel (PUSCH) from the K TCI states according to TCI-state indication information in downlink control information (DCI), wherein the target TCI state is a TCI state indicated by the TCI-state indication information from the K TCI state that is used for PUSCH transmission and activated via the MAC CE, wherein each indication value of the TCI-state indication information corresponds to one or more TCI states among the K TCI states; and determining a power control parameter of the PUSCH according to the target TCI state and the correspondence between M TCI states and power control parameters in the RRC signaling.

2. A terminal, comprising:

a transceiver;

a memory storing computer programs; and a processor configured to invoke and execute the computer programs to:

cause the transceiver to receive radio resource control (RRC) signaling, wherein the RRC comprises a correspondence between M transmission configuration indication (TCI) states and power control parameters, M being an integer and M>=1; wherein each of the M TCI states comprises: a quasi co-location (QCL) type, a source reference signal, a reference serving cell, and a reference bandwidth part (BWP); wherein each of the power control parameters comprises: a parameter used for determining a target receive power, a parameter used for determining a pathloss weight factor, and a parameter used for determining a closed-loop power control adjustment state;

activate, via a media access control-control element (MAC CE), K TCI states from the M TCI states, K≤M;

determine a target TCI state for a physical uplink shared channel (PUSCH) from the K TCI states according to TCI-state indication information in downlink control information (DCI), wherein the target TCI state is a TCI state indicated by the TCI-state indication information from the K TCI state that is used for PUSCH transmission and activated via the MAC CE, wherein each indication value of the TCI-state indication information corresponds to one or more TCI states among the K TCI states; and determine a power control parameter of the PUSCH according to the target TCI state and the correspondence between M TCI states and power control parameters in the RRC signaling.

3. A network device, comprising:

a transceiver;

a memory storing computer programs; and a processor configured to invoke and execute the computer programs to:

configure for a terminal a correspondence between M transmission configuration indication (TCI) states and power control, via radio resource control (RRC) signaling, wherein M is an integer and M>=1, each of the M TCI states comprises: a quasi-co-location (QCL) type, a source reference signal, a reference serving cell, and a reference bandwidth part (BWP); each of the power control parameters comprises: a parameter used for determining a target receive power, a parameter used for determining a pathloss weight factor, and a parameter used for determining a closed-loop power control adjustment state; and configure for the terminal a target TCI state for a physical uplink shared channel (PUSCH) via downlink control information (DCI), wherein the target TCI state and the correspondence are used for the terminal to determine a power control parameter of the PUSCH; the DCI comprises TCI-state indication information, and each indication value of the TCI-state indication information corresponds to one or more TCI states among K TCI, wherein the target TCI state belongs to the K TCI states, and the K TCI states belong to the M TCI states and are to be activated by the terminal via a media access control-control element (MAC CE), K≤M.

4. The method of claim 1, further comprising:

receiving a carrier set configured by a network device, wherein at least one PUSCH on each carrier in the carrier set that is of the same type as the PUSCH also corresponds to the target TCI state, or at least one PUSCH on each carrier in the carrier set that is of the same type as the PUSCH corresponds to a TCI state with the same TCI state ID as the target TCI state.

5. The terminal of claim 2, wherein the transceiver is further configured to:

receive a carrier set configured by a network device, wherein at least one PUSCH on each carrier in the carrier set that is of the same type as the PUSCH also corresponds to the target TCI state or at least one PUSCH on each carrier in the carrier set that is of the same type as the PUSCH corresponds to a TCI state with the same TCI state ID as the target TCI state.

6. The network device of claim 3, wherein the transceiver is further configured to:

transmit a carrier set configured by a network device to the terminal, wherein at least one PUSCH on each carrier in the carrier set that is of the same type as the PUSCH also corresponds to the target TCI state, or at least one PUSCH on each carrier in the carrier set that is of the same type as the PUSCH corresponds to a TCI state with the same TCI state ID as the target TCI state.

7. The method of claim 1, wherein the closed-loop power control adjustment state comprises: P0-AlphaSetId and ClosedLoopIndex.

8. The method of claim 7, wherein the ClosedLoopIndex is enumerated as {i0, i1}.

9. The terminal of claim 2, wherein the closed-loop power control adjustment state comprises: P0-AlphaSetId and ClosedLoopIndex.

10. The terminal of claim 9, wherein the ClosedLoopIndex is enumerated as {i0, i1}.

11. The network device of claim 3, wherein the closed-loop power control adjustment state comprises: P0-AlphaSetId and ClosedLoopIndex.

12. The network device of claim 11, wherein the ClosedLoopIndex is enumerated as {i0, i1}.

* * * * *